United States Patent [19]

Cornelison et al.

[11] Patent Number: 4,976,929
[45] Date of Patent: Dec. 11, 1990

[54] ELECTRICALLY HEATED CATALYTIC CONVERTER

[75] Inventors: Richard C. Cornelison, Hiram; William A. Whittenberger, Garrettsville, both of Ohio

[73] Assignee: W. R. Grace & Co.-Conn., New York, N.Y.

[21] Appl. No.: 483,978

[22] Filed: Feb. 20, 1990

Related U.S. Application Data

[63] Continuation of Ser. No. 196,301, May 20, 1988, abandoned.

[51] Int. Cl.$^5$ .......................... B01D 53/36; F01N 3/10
[52] U.S. Cl. .................................... 422/174; 422/199; 422/177; 60/299; 60/300
[58] Field of Search ........................ 422/174, 177, 199; 60/299, 300

[56] References Cited

U.S. PATENT DOCUMENTS

| | | | |
|---|---|---|---|
| 1,789,812 | 1/1931 | Frazer | 422/174 X |
| 3,768,982 | 10/1973 | Kitzner et al. | 23/288 F |
| 3,770,389 | 10/1973 | Kitzner et al. | 422/174 |
| 4,205,045 | 5/1980 | Westernacher et al. | 422/199 X |
| 4,277,442 | 7/1981 | Hergart | 422/174 X |
| 4,711,009 | 12/1987 | Cornelison et al. | 422/180 X |

FOREIGN PATENT DOCUMENTS

| | | | |
|---|---|---|---|
| 2333092 | 1/1975 | Fed. Rep. of Germany | 422/174 |
| 2359778 | 11/1975 | Fed. Rep. of Germany | 422/174 |

Primary Examiner—Robert J. Warden
Assistant Examiner—Lynn M. Kummert
Attorney, Agent, or Firm—Edward J. Cabic

[57] ABSTRACT

There is provided an improved electrically heated accordion folded corrugated thin metal catalytic converter for hydrocarbon or alcohol fueled engine exhaust, particularly internal combustion engine exhaust, having a simplified construction and characterized in that the entire corrugated thin metal monolith, or monoliths, serves as a resistance heater to bring the catalyst up to optimum operating temperature quickly and thereby reduce the escape of pollutants into the atmosphere upon start-up, and which does not depend upon conduction as a mdoe of heat transfer to achieve such temperature.

17 Claims, 4 Drawing Sheets

ELECTRICALLY HEATED CATALYTIC CONVERTER

This is a continuation of application Ser. No. 196,301, filed May 20, 1988, now abandoned.

This invention relates, as indicated, to a catalytic converter or particulate trap for conversion of pollutants in a gas stream, e.g., an exhaust gas stream, to harmless ingredients. More particularly, the invention relates to an electrically heated metal honeycomb core whereby the converter or trap is heated to a favorable operating temperature. This is beneficial especially at start-up of an automobile engine when the catalytic converter is at a temperature below that needed for the conversion of the pollutant or pollutants contained therein to harmless, environmentally acceptable gases. The invention can also be used to convert methanol to hydrogen and carbon monoxide, so that the resulting gas is easy to combust. Carbon monoxide, nitrogen oxides carbon particulates and volatile organic compounds in the exhaust of an internal combustion engine may also be converted.

BACKGROUND OF THE INVENTION AND PRIOR ART

The conventional catalytic converter utilizes a ceramic monolith on which is deposited a catalyst which aids in the conversion of pollutants such as, carbon monoxide, nitrogen oxides ($NO_x$), unburned hydrocarbons, etc., to carbon dioxide, nitrogen, and water. However, this conversion is not efficient initially while the exhaust gases are relatively cold. To be effective at a high conversion rate, the catalyst and surface with which the exhaust gases come in contact must be at a minimum elevated temperature; 390° F. for carbon monoxide, 570° F. for volatile organic compounds, and 1000° F. for natural gas. Otherwise, the conversion to harmless by-products is low and cold-start pollution of the atmosphere is high. Of course, once the exhaust system comes to its operating temperature, the catalytic converter is effective. Hence, it is to the achievement of early conversion of pollutants before normal operating temperature is obtained or operation when low temperatures are encountered that the present invention is directed.

The principle of elevating the temperature of a catalytic converter to a higher more efficient operating temperature for start-up is not, per se, new. Reference may be had to U.S. Pat. No. 3,768,982 to Kitzner dated Oct. 30, 1973. In this patent, heat from a centrally located electric heater is transferred by conduction through a monolithic catalyst support to heat the catalyst to an optimum operating temperature. Reference may also be had to U.S. Pat. No. 3,770,389 to Kitzner dated Oct. 30, 1973 which discloses a central electrically heated core within a ceramic monolith, heat being transmitted by conduction to the catalyst contained in the openings of the ceramic monolith. The heating core is formed of metal sheets, one flat and one corrugated, coated with alumina and also bearing a catalyst. The metallic core is heated electrically by virtue of its own electrical resistance.

Recent attempts at electrically heating catalysts have shown that corderite ceramic and silicon carbide, while having considerable electrical resistance, are too brittle to accommodate the relatively large electrodes and high current flow required for electrically heated converters. Furthermore, earlier attempts at electrically heating the catalyst do not take advantage of the low backpressure associated with metallic honeycomb catalytic converters, nor do they take advantage of the very high heat transfer efficiency when the catalyst containing ferritic strip is also used as the electrical conductor and heating element.

Reference may be had to the U.S. Pat. No. 4,711,009 to Cornelison and Retallick, dated Dec. 8, 1987 for details of the preparation of accordion folded thin stainless steel honeycomb converter units having a catalyst supported on an aluminum oxide surface. This patent is incorporated herein by reference thereto.

The devices of the present invention are distinguished from the prior art structures in that they do not depend upon conduction to transmit heat, a time consuming event. In the present invention, the entire catalytic monolith is formed of corrugated thin metal foil which becomes the resistance heater and whereby the entire monolith is elevated in temperature rather than depending on conduction through a ceramic, for example, to achieve the desired temperature. The devices of the present invention will achieve optimum catalyst temperature in from 2 to 20 seconds depending upon the voltage potential, as compared to several minutes for converters depending on conduction as the mode of heat transfer. This is an important distinction if one is obligated to wait for a catalytic converter to achieve "light-off" or optimum operating temperature before starting the engine. Moreover, the corrugated metal foil structure is nonnesting and the necessity for a flat metal sheet is obviated. Still further, spirally wound devices as illustrated in the prior art are subject to telescoping of the catalyst support unit under operating conditions.

BRIEF STATEMENT OF THE INVENTION

Briefly stated, the present invention is in an electrically heated converter for treatment of an exhaust gas stream to remove one or more pollutants therefrom, or a converter to dissociate methanol or similar fuels, by catalytic means, ahead of the engine. The converters hereof comprise a metallic housing having an exhaust gas inlet and a treated exhaust gas outlet. Insulation means are provided for electrically isolating the core from the housing electrically. Inside the housing, there is provided an accordion folded nonnesting corrugated thin metal foil honeycomb having on each surface thereof an aluminum oxide coating including a noble metal catalyst deposited thereon. Electrical conductors are joined as by welding to the respective ends of the accordion folded honeycomb, and a switch controlled source of electrical potential is provided across said electrical conductors. The electrical arrangement enables the entire honeycomb to be selectively resistance heated rapidly to a temperature of at least 300° F., and/or to be controlled continuously within a specified temperature range via a temperature feedback loop. The metal foil is desirably stainless steel with a wash coat of aluminum oxide and/or one or more of ceria, titania, zirconia, lanthia, or other refractory or base metal on each surface thereof. In most embodiments of this invention, a catalyst is present, which is comprised of platinum with or without a base metal oxide, e.g. iron oxide, $Fe_2O_3$ or palladium alone or in admixture with rhodium.

BRIEF DESCRIPTION OF THE DRAWINGS

The invention may be better understood by having reference to the annexed drawings wherein.

DETAILED DESCRIPTION OF THE INVENTION

As indicated above, electrical energy can be used to trigger or catapult a catalyst into its optimum working temperature range. The catalyst can then serve in its intended function of converting pollutants in an exhaust gas stream to benign components or reforming chemicals or fuel such as methanol. The chemical reaction, if oxidation, is exothermic, and the exotherm can thus become a contributor to the energy balance and temperature of the system once the "light-off" temperature of the catalyst has been reached.

If there is a sufficient catalyst and if the intake temperature of air is not too cold, the supply of electricity may be modulated or discontinued once the catalyst becomes active, i.e., arrives at the "light-off" temperature. The reaction, e.g., oxidation, then becomes self-supporting due to the conversion of chemical energy in the exhaust stream or in a particulate trap to heat energy which allows the catalyst to remain in the thermal region where catalytic activity is at its peak. The use of electrical energy to promote catalyst "light-off" thus can have a leveraged fuel savings effect in industrial catalytic oxidation systems.

Moreover, an electrically heated catalytic converter is especially useful during the cold start-up period in combustion processes. The majority of pollutants are not catalyzed at start-up because both the exhaust gas and the catalytic monolith are well below the most effective or "light-off" temperature. Until such time as the exhaust is sufficiently hot to cause catalytic "light-off", there is no effective emission control. For spark ignited internal combustion engines, this period of non-existent or low catalytic activity can exist for approximately five minutes and can account for about 75% of the emissions during the first hour of engine operation.

By the same token, catalysts used as reformers can become effective only after reaching light-off temperature.

Referring now more particularly to the drawings, there is shown in cross-section (FIG. 1) and in transverse cross-section (FIG. 2), a converter in accordance herewith.

Figure 1:
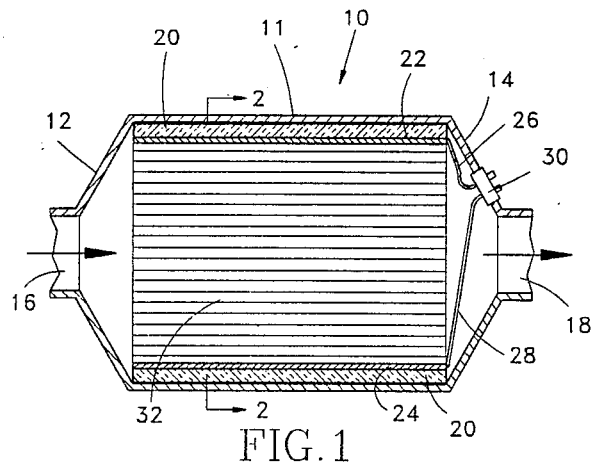
FIG. 1 is a cross-sectional view of a converter in accordance with this invention and showing an accordion folded honeycomb catalytic monolith formed of a thin metal sheet and the electrical contacts at each end thereof for passing an electrical current therethrough for at least the initial start-up of operation.
Figure 2:
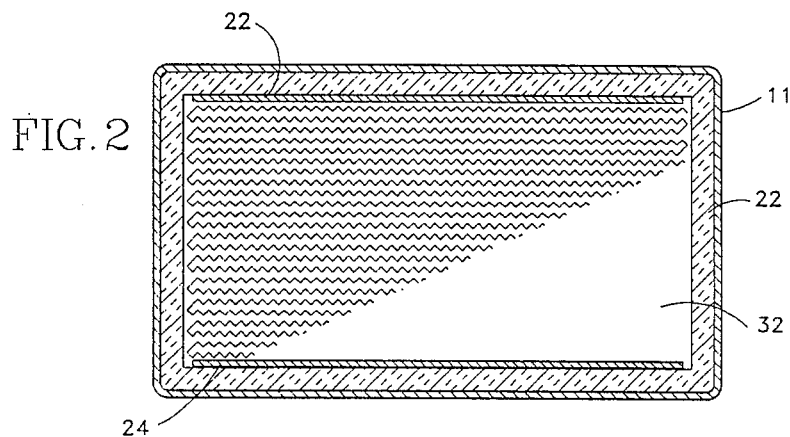
FIG. 2 is a transverse cross-sectional view showing the accordion folded nonnesting honeycomb, the straight openings therethrough and the electrical contacts at each end of the accordion folded structure, as it appears in the plane indicated by the line 2—2 in FIG. 1.

FIG. 1 is a cross-sectional longitudinal view of a device 10 in accordance with the present invention. The device has an outer metallic housing 11, e.g., steel, which is rectangular in cross-section with end caps 12 and 14 thereon necked down to an inlet 16 and an outlet 18 for the passage of exhaust gas into and out of the device, respectively. The housing 11 contains an accordion folded nonnesting corrugated stainless steel monolith 32 electrically isolated from the metallic outer shell of the housing 11 by insulation 20, which desirably completely surrounds the entire monolith 32.

Electrical power is supplied to the monolith 32 by electrode 32 lying along the upper extremity of the monolith 22 and electrode 24 lying along the lower extremity of the monolith 32 and having an opposite polarity. Monolith 32 serves as a resistance between the electrodes 22 and 24, and when power is supplied to the electrodes 22 and 24, the latter heats rapidly to the desired temperature. Power is supplied to the monolith through leads 26 and 28 which exit from the device in a suitable external plug 30 also electrically isolated from the metallic housing 11 or the end cap 14 (FIG. 1). The voltage applied across the electrodes 22 and 24 in the case of gasoline powered 4-wheel passenger cars is usually 12 or 24 volts and in the case of diesel truck, for example, is usually 24 volts. Instead of a single monolith of corrugated thin metal foil, there may be a plurality of such monoliths separated from the housing 11 by suitable insulation and connected in parallel to electrodes 22 and 24. Attachment to the electrodes in either case is conveniently by spot welding.

In one embodiment of the invention, a ferritic stainless steel strip having a width of 3.5 inches, which dimension is typical of a metal foil catalytic converter, had a resistance of 0.10 ohm per foot when cold. When hot, this value may rise to 0.12 ohm per foot. If a space velocity typical of automotive designs is used, e.g., 100,000 hr.$^{-1}$ then the cross-section of the converter will be approximately 14 square inches. In one embodiment, a pair of catalytic converter units in axial tandem relation were used. The upstream unit was electrically heated, and the downstream unit was not. The total volume for both beds calculates to 98 cubic inches. This is equivalent in internal surface area to a ceramic converter of approximately 140 cubic inches. The electrically heated catalyst unit has a bed volume of 49 cubic inches. The number of cells per square inch generally ranges from about 100 to 500, conveniently 130 to 160 cells/sq. in. The thin metal has a thickness of from 0.001 to 0.005 inch.

A ferritic stainless steel having 5% to 10% by weight of aluminum either on the surface or alloyed in the body of the foil, and of a thickness of 0.0025"×3.5" width, has a resistance of 0.10 ohms per foot of length at 70° F. When the temperature is increased to approximately 500° F. as measured by thermocouples, the resistance of the strip is 0.12 ohms.

Figure 3:
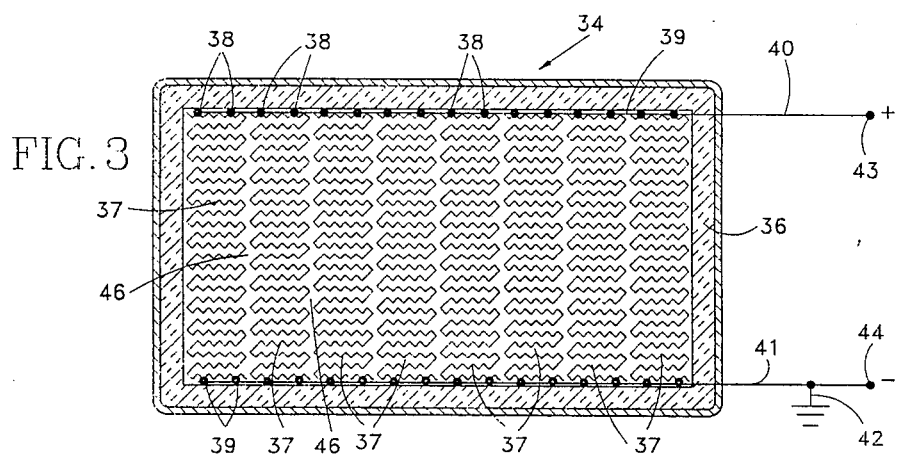
FIG. 3 is an end view of a catalytic converter in accordance herewith in which are provided a plurality of accordion folded strips of nonnesting corrugated thin metal connected in parallel which provides high current density, while limiting the voltage drop between adjacent laminations and preventing short circuits to develop, which would burn away the catalyst and foil as well as wasting energy.

When several strips of the above cross-section and of an appropriate length, e.g., 30 to 35 inches, are corrugated so as to be nonnesting when accordion folded according to the aforementioned U.S. Pat. No. 4,711,009, and energized by a 12 volt battery power supply in a parallel electrical configuration, such as shown in FIG. 3, the resistance of the circuit can be made such that up to 1.2 kilowatts of power can be transferred to the strip heaters. Six strips connected in parallel showed that a temperature of about 500 F. can be reached in 15 seconds. This temperature is high enough to bring the catalyst (platinum) to a "light-off" condition. Automotive catalysts typically "light-off" according to the following table, all in degrees F.

TABLE I

| Pollutant | Fresh Converter | Aged Converter |
|---|---|---|
| Carbon Monoxide | 390° F. | 570° F. |
| Volatile Organic Compounds | 570° F. | 750° F. |
| Nitrogen Oxides | 750° F. | 930° F. |

Fifteen seconds is adjudged to be as long a period as practicable before the engine's starter motor is engaged, yet within the capacity of the automotive battery. The drain on the battery, for example, is ¼ minute×300 amperes or 1.25 ampere hours.

It has been found that for a configuration of six accordion folded strips connected in electrical parallel in the above example, and such that each is corrugated so as to be nonnesting and then accordion folded, as set forth in U.S. Pat. No. 4,711,009, the hinge or fold lines must not be more than 1.00 inch centerline to centerline in order to avoid overstressing the dielectric strength of the washcoat (alumina). If this dimension is exceeded, the voltage across opposing faces of adjacent laminations will result in excessive potential, e.g., 0.75 volts maximum. If this voltage is exceeded, the insulation value of the washcoat can be overstressed and could, therefore, cause a short circuit between laminations, locally overheating, the converter and wasting battery power.

Referring now, more particularly to FIG. 3, there is here shown an electrically heatable core 34 surrounded by insulation 36. Disposed within the insulation envelope 36 are eight accordion folded corrugated monoliths 37. Each of the monoliths 37 is spot welded as at 38 to a positive electrode 39 having a lead 40 located at the top thereof as shown in FIG. 3. Each of the monoliths 37 is also spot welded as at 39 to a negative electrode 41 which is grounded as at 42. The electrodes 39 and 41 are electrically isolated from the housing (not shown in FIG. 3). The ends of the leads 43 and 44 are suitably connected to a battery, e.g., a 12 volt battery. Alternatively, the negative electrode may be connected to the frame of an automobile or converter housings if desired. Insulation strips may optionally be interposed between adjacent monoliths 37 in the spaces such as space 46.

Insulation strips are not normally necessary because at any point of contact between adjacent monoliths, the voltage difference will be essentially zero. Moreover, without special means to hold the insulation strips in the spaces between monoliths, e.g. at 46, such strips are likely to be blown out of the unit.

Figure 4:
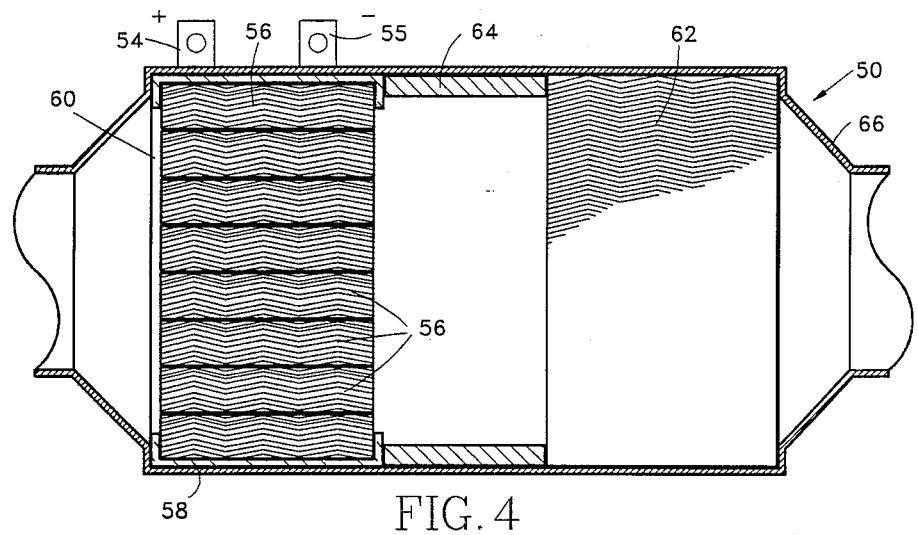
FIG. 4 is a top longitudinal cross-sectional view of an assembled converter showing one electrically heated catalytic monolith and an unheated accordion folded core in series relation and separated by a spacer.

FIG. 4 is a top cross-sectional view of an assembled converter 50 showing an electrically heated core element 52 composed of eight individual monoliths of accordion folded nonnesting herringbone corrugated thin stainless steel welded at each end to electrodes, (not shown) but as in FIG. 3. The positive electrode is connected to an external terminal 54 and the negative electrode is connected to an external terminal 56. Insulation 58 is wrapped around the electrically heated core unit 60.

Also shown in FIG. 4 is an unheated accordion folded corrugated nonnesting thin metal monolith 62. This is spaced from the electrically heated core 60 by a steel ring spacer 64. There is, of course, no need to insulate this core from the metal housing 66. Each of the core units 60 and 62 has an axial dimension of about 3.5 inches, and the spacer 64 is about 1.5" in an axial direction. The cores 60 and 62 are formed of ferritic or austenitic stainless steel and corrugated with a herringbone chevron pattern.

Figure 5:
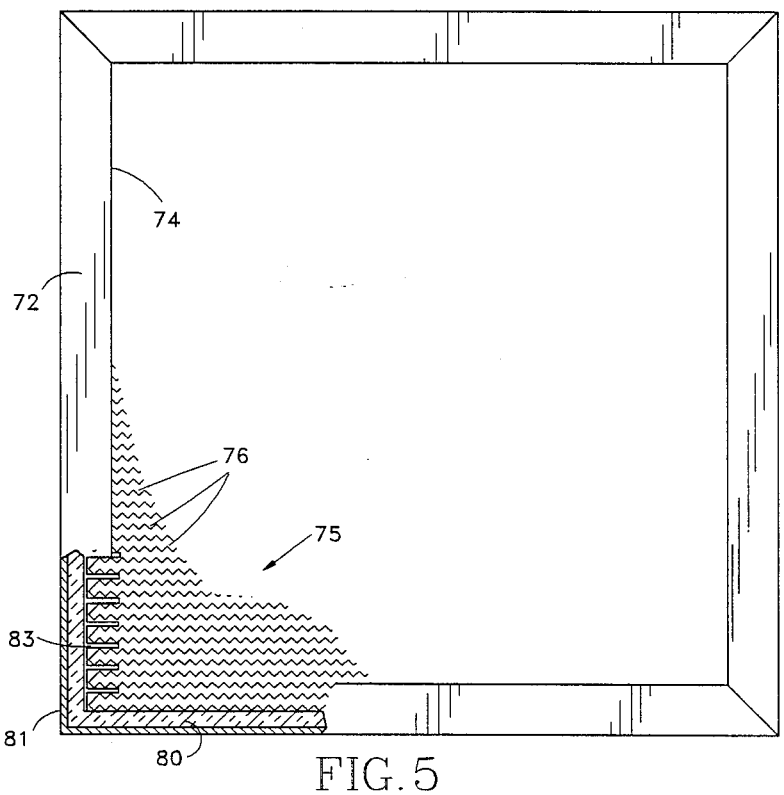
FIG. 5 is a partially cut away front view of an industrial converter having accordion folded continuous or individual layers of corrugated thin metal foil extending from side to side and a basket weave electrode at each end of the core, each electrode being attached electrically to positive and negative poles of an electric power source, respectively. The assembly is isolated from the metallic housing by ceramic mat.

FIG. 5 shows an electrically heated catalytic converter 70 having a stainless steel frame 72 in the form of a square, and conveniently 0.058 inch thick. The frame 72 is provided with a folded over lip 74 for the purpose of holding corrugated laminations 76 in place. An electrical conductor is "basket woven" among the layers at each end of the horizontal traverse as shown in FIG. 5, to provide a source of electrical power to the core 75 to effect heating thereof. Between the ends 78 of the laminations of corrugated thin metal and the frame 72, there is provided a layer of insulation 80 to isolate the core from the frame 72.

The structure shown in FIG. 5 is useful as a module from which large industrial catalytic converters can be fabricated. The frames may be from 1 foot on a side to about 10 feet on a side. The core 75 may be accordion folded.

Figure 6:
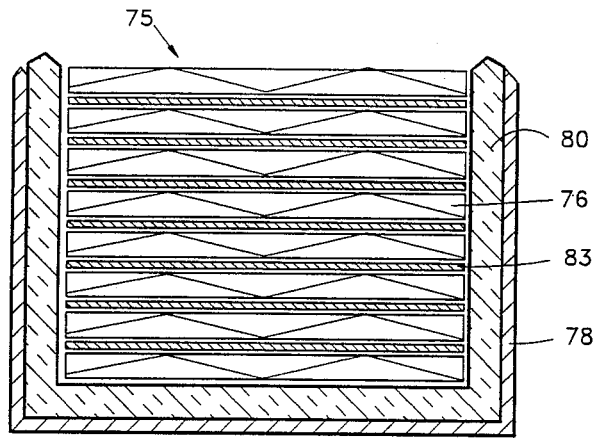
FIG. 6 is a partial cross-sectional view showing an end of an accordion folded monolith with an electrode interwoven among the layers of corrugated metal foil and a wrapping of insulation to isolate the core from the metallic housing. This view is as indicated by the plane 6—6 in FIG. 7.
Figure 7:
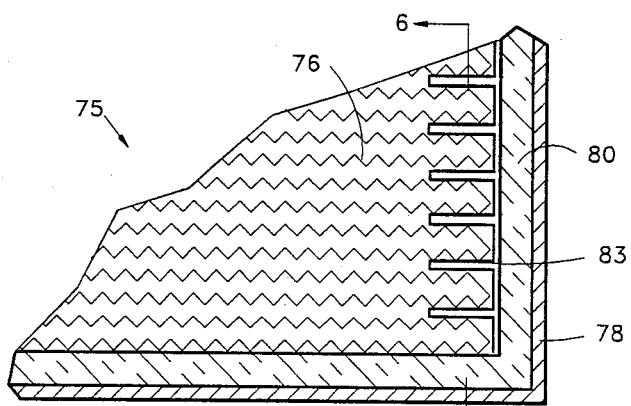
FIG. 7 is a partial cross-sectional view in a plane 90 degree rotated from the view shown in FIG. 6 and showing the mode of interleafing the electrode among the layers of the corrugated thin metal core.
Figure 8:
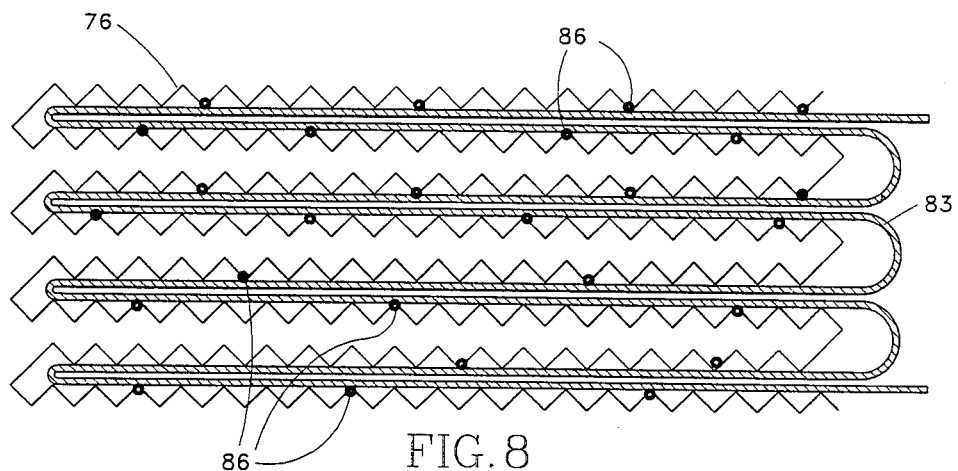
FIG. 8 is a partial view of the core showing the mode of "basket weaving" the electrode among the corrugated layers and welding the electrode to the respective layers.

FIGS. 6, 7 and 8 show details of the core 75 from one end thereof. FIG. 7 shows a fragmentary view of the end of the layers 76, the electrical conductor 83, the insulation 80 and the housing or frame 81. As shown in FIG. 8, the layers 76 are spot welded as at 86.

Figure 9:
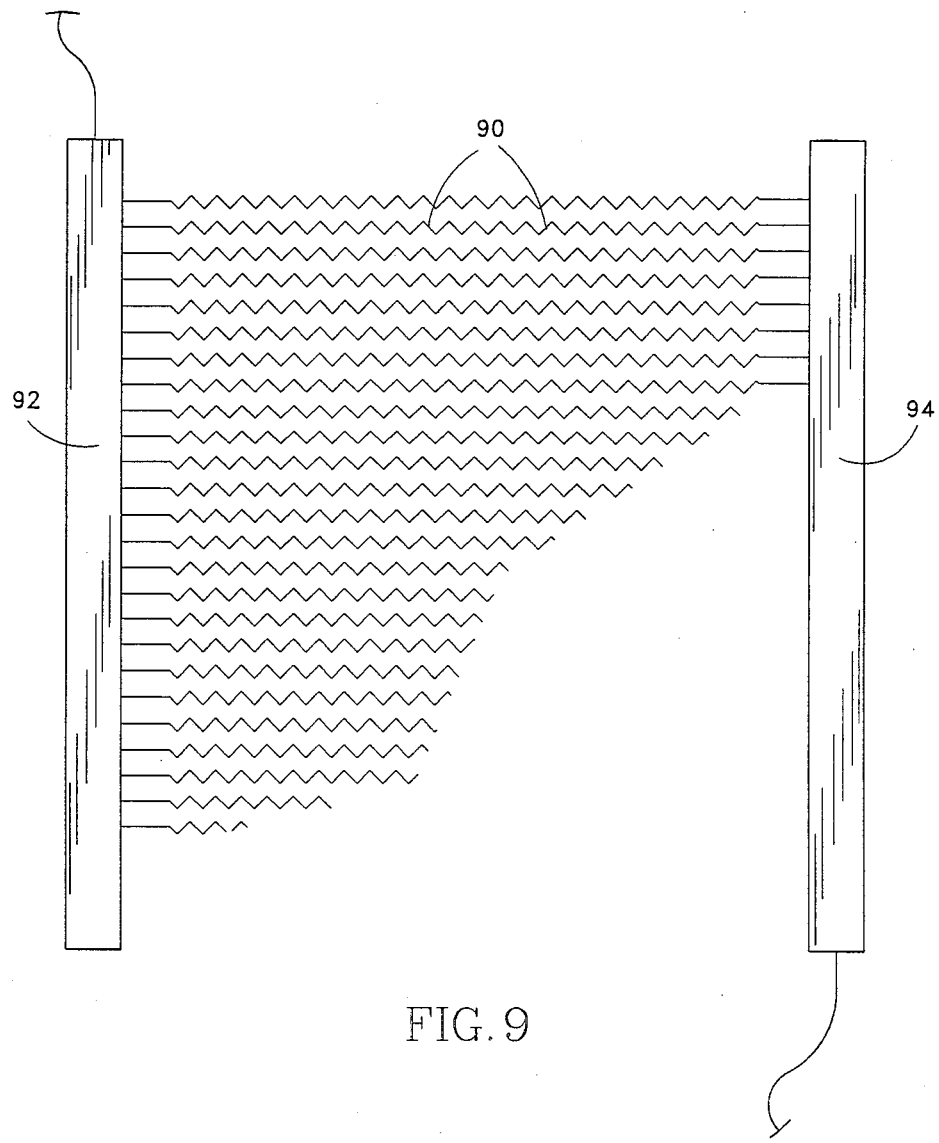
FIG. 9 is a view showing an arrangement of a plurality of layers of corrugated thin metal strips connected electrically to positive and negative electrodes, respectively, at either end of the layers.

FIG. 9 shows another form for connecting the layers to the electrodes. Thus, there is shown a plurality of corrugated thin metal layers of alumina coated foil 90 joined at the respective ends thereof first to a positive electrode 92 and at the opposite end to a negative electrode 92 or to ground. The layers 90 provide parallel resistance paths of individual corrugated metal laminations coated with refractory metal oxide, e.g., alumina, coated on thin metal foil. The core size is conveniently 3.5 inches by 2 feet by 2 feet. The number of cells per square inch is conveniently 160. The foil forming the core 90 may also be accordion folded with the fold-over portions being spot welded to the respective positive and negative electrodes 92 and 94.

A unique feature of the devices of the present invention is that the washcoat of alumina, or other refractory metal oxide, or for example a rare earth metal oxide, e.g. ceria, lanthia, yttria, or Misch metal oxide, etc. typically 0.0005" per side of the foil, serves the dual function of being a carrier surface for the catalytic material as well as acting as an interlamination dielectric. Thus, the thin insulated laminations present an open area of 85% to 90% to the exhaust stream, whereas if separate insulating layers as thin as 0.0005" were placed between the laminations, the open area would be less than 60%. The smaller open area would have the effect of increasing the overall pressure drop, or the overall size of a given converter, or both. Pressure drop across catalysts used within automobile engines is typically 2" of water at idle, and 12 to 15" at turnpike speeds. A considerable waste of engine output would be present if the pressure drop were allowed to be higher. Moreover, in all automotive designs, the outside space is at a premium.

In the case of the test core, the hinge lines were approximately 0.6 inch from centerline to centerline. This provides a finished core of an appropriate geometry for automotive use.

In nonautomotive converters, the module is made up of layers of individual strips of corrugated foil, typically 24 inches long measured hinge centerline to hinge centerline. In this case, the voltage differential end to end of each 2 foot lamination, using the same cross-section geometry as in the above example, would be 24 volts at a 0.2 ohm strip resistance and would draw a current of about 120 amps converting 2.88 kilowatts of electrical energy to heat energy. Each end of the 2 foot strips would be connected to the positive and negative electrodes, respectively.

The washcoat typically used on the surface of metal honeycomb catalytic converters consists of the oxide of aluminum alone or in combination with other metal oxides of refractory metals, e.g., titanium dioxide. These washcoats have a surface-to-surface breakdown voltage on contact of 0.75 volts DC. Thus, the voltage between adjacent layers of accordion folded metal honeycomb should not exceed 1.0 volts DC or 0.7 volts AC and preferably should not exceed 0.75 volts DC. Otherwise, excessive leakage current will flow within the catalyst and heating efficiency will be diminished. Moreover, the catalyzed foil will likely be burned or oxidized at the point of dielectric failure of the insulating washcoat layer, thus reducing the effectiveness of the unit as a heater and wasting energy.

As indicated above, either a hydrocarbon fuel, ether or an alcohol, e.g., methanol or ethanol, may be used in the internal combustion engine. Methanol is currently under consideration as a fuel.

In a typical device in accordance with this invention, the voltage was 24 volts, the current 28-35 amperes, the power, 756 watts, the time 12 minutes, the energy consumed 544,320 Joules or 0.1512 Kilowatt-hour, and the outlet temperature of the gas at engine start, 650° F.

There has thus been provided an improved electrically heated corrugated thin metal catalytic converter for hydrocarbon or alcohol fueled internal combustion engine exhaust having a simplified construction, and characterized in that the entire corrugated thin metal monolith serves as a resistance heater to bring the catalyst up to optimum operating temperature quickly and thereby reduce the escape of pollutants into the atmosphere upon start-up and which does not depend upon conduction to achieve such temperature.

What is claimed is:

1. In a converter for treating an exhaust gas stream to remove one or more pollutants therefrom and comprising in combination a metallic housing having an exhaust gas inlet and a treated exhaust gas outlet, and an accordion folded non-nesting corrugated thin metal foil honeycomb positioned and arranged in juxtaposition with said metallic housing to radially fill said housing, said corrugated thin metal foil honeycomb having on each surface thereof a refractory metal oxide and/or rare earth metal oxide coating optionally including a heavy metal catalyst deposited thereon, the improvement in quick light-off capability comprising
    (a) insulating means positioned between the metallic housing and the accordion folded non-nesting corrugated thin metal foil honeycomb for insolating the housing electrically,
    (b) electrical conductors joined to said accordion folded honeycomb to form more than 2 parallel electrical circuits, and
    (c) a source of electrical potential connected across said electrical conductors, whereby the entire honeycomb of the electrically heated converter may be selectively electrically heated to a temperature of at least 300 degrees F.

2. An electrically heated converter in accordance with claim 1 wherein a heavy metal catalyst is present and comprises platinum.

3. An electrically heated converter in accordance with claim 1 wherein a heavy metal catalyst is present and comprises palladium.

4. An electrically heated converter in accordance with claim 1 wherein a heavy metal catalyst is present and is palladium.

5. An electrically heated catalytic converter in accordance with claim 1 wherein a heavy metal catalyst is present and is a mixed catalyst of platinum and rhodium.

6. An electrically heated catalytic converter in accordance with claim 1 wherein a heavy metal catalyst is present and is a mixed catalyst of platinum and a base metal oxide.

7. An electrically heated catalytic converter in accordance with claim 1 wherein the thin metal foil is thin stainless steel foil.

8. An electrically heated catalytic converter in accordance with claim 1 wherein the thin metal foil is thin stainless steel foil coated with aluminum metal.

9. An electrically heated catalytic converter in accordance with claim 1 wherein the thin metal foil has a thickness of from 0.001 inch to 0.005 inch.

10. An electrically heated catalytic converter in accordance with claim 1 in which the refractory metal oxide is alumina.

11. An electrically heated catalytic converter in accordance with claim 1 in which the refractory metal oxide is titania.

12. An electrically heated catalytic converter in accordance with claim 1 in which the refractory metal oxide is a rare earth metal oxide.

13. An electrically heated catalytic converter in accordance with claim 1 in which the refractory metal oxide is selected from the group consisting of ceria, lanthia, yttria, and Misch metal oxide.

14. An electrically heated catalytic converter in accordance with claim 1 wherein the accordion folded corrugated nonnesting thin metal foil honeycomb is composed of a plurality of accordion folded corrugated nonnesting thin metal honeycombs positioned and arranged in parallel between the electrical conductors.

15. An electrically heated catalytic converter in accordance with claim 1 wherein the electrical potential between any two corrugated laminations in juxtaposition at any point is not in excess of 1.0 volts DC or 0.7 volts AC.

16. An electrically heated catalytic converter in accordance with claim 1 wherein the entire honeycomb may be selectively heated to a temperature of at least 300 degrees F. in a period of from 2 to 20 seconds.

17. An electrically heated catalytic converter in accordance with claim 14, wherein said plurality of corrugated thin metal honeycombs are accordion folded along fold lines having a spacing of not more than 1.0 inch.

* * * * *